United States Patent [19]

Schrems

[11] Patent Number: 4,659,347

[45] Date of Patent: Apr. 21, 1987

[54] METHOD OF AND DEVICE FOR PURGING WATER FROM CERTAIN CONTAMINANTS

[75] Inventor: Emil Schrems, Vienna, Austria

[73] Assignee: Innova Wiener Innovationsgesellschaft M.B.H., Vienna, Austria

[21] Appl. No.: 587,931

[22] Filed: Mar. 9, 1984

[30] Foreign Application Priority Data

Mar. 11, 1983 [AT] Austria ................................ 880/83

[51] Int. Cl.$^4$ .............................................. B01D 19/00
[52] U.S. Cl. ...................................... 55/186; 55/193; 55/194
[58] Field of Search ............... 55/41, 43, 52, 55, 165, 55/178, 190, 192, 194, 193, 183–188

[56] References Cited

U.S. PATENT DOCUMENTS

| | | | |
|---|---|---|---|
| Re. 27,882 | 1/1974 | Burnham | 55/55 X |
| 2,764,533 | 9/1956 | Oetjen et al. | 55/52 X |
| 3,362,132 | 1/1968 | Schellenberg | 55/55 X |
| 3,996,027 | 12/1976 | Schnell et al. | 55/41 X |
| 4,002,432 | 1/1977 | Brice et al. | 55/41 X |
| 4,201,555 | 5/1980 | Tkach | 55/55 X |
| 4,216,089 | 8/1980 | Boon et al. | 55/55 X |
| 4,272,258 | 6/1981 | Shifflett | 55/55 X |
| 4,316,725 | 2/1982 | Hovind et al. | 55/41 |

*Primary Examiner*—Tom Wyse
*Attorney, Agent, or Firm*—Karl F. Ross; Herbert Dubno

[57] ABSTRACT

In order to remove certain contaminants such as hydrocarbons and phenols from water, one or more streams of water to be purged are injected into a vessel in which the pressure is maintained low enough to let the water partly evaporate together with the contaminants at or possibly below room temperature. The vapors are exhausted and the remaining water is led off to a reservoir. The vessel may be provided above the water level with baffles or with a particulate filler serving to delay the removal of the vapors therefrom.

2 Claims, 5 Drawing Figures

METHOD OF AND DEVICE FOR PURGING WATER FROM CERTAIN CONTAMINANTS

FIELD OF THE INVENTION

My present invention relates to a method of and a device for purging impurity-laden water, e.g. the effluent of industrial plants, from certain contaminants such as hydrocarbons and phenols whose vapor pressures are not substantially less than that of water at a given temperature.

BACKGROUND OF THE INVENTION

The conventional way or decontaminating such waters is to pass them through a filter of active carbon retaining the hydrocarbons and the phenols. This method is rather cost-intensive in the establishment of the plant, in its operation and in its maintenance. Thus, currently available activated carbons reacting with water having a residual concentration of chlorinated hydrocarbons of less than 25 micrograms per liter can absorb them at a rate of only about 1% of their own weight; with an average load of 200 µg/liter of chlorinated hydrocarbons one would need a filtering unit consuming at least 1300 kg (or about 3.5 to 4 cubic meters) per year to satisfy the drinking-water needs of 1000 inhabitants.

However, the most significant financial and technical drawback of this technique lies in the need for regenerating the active carbon. This is necessary because, on the one hand, the carbon is a valuable material (worth about $20 to $30 per 100 kg) and, on the other hand, a removal of the spent carbon to a dump creates problems. Still, the expenditures for erecting and maintaining regeneration plants are high.

OBJECT OF THE INVENTION

The object of my present invention, therefore, is to provide a simpler and much less expensive method and device for the purification of water contaminated with one or more compounds of the type referred to above.

SUMMARY OF THE INVENTION

I have found, in accordance with my present invention, that lower-boiling hydrocarbons and phenols can be readily separated from much of the accompanying water in the vapor phase, especially when vaporization is brought about at temperatures well below the normal boiling point of water (100° C.) by a suitable reduction in pressure below the atmospheric level. Thus, the method according to my invention comprises the steps of (a) emitting the water in one or more jets into a vessel maintained under a pressure low enough to let part of that water be vaporized—together with accompanying contaminants—at an ambient temperature, preferably at or below the usual room temperature of about 20°-25° C.; (b) exhausting the resulting vapors from an upper region of the vessel; and (c) draining the remaining water from a lower region of the vessel. The evolving water vapor serves as a carrier for the extracted contaminants.

Although one might assume at first that this method works only with compounds whose boiling points are below that of water, I have discovered that higher-boiling impurities can also be removed thereby. Tetrachloroethylene, for example, with a boiling point of 121° C. under atmospheric pressure forms with water an azeotropic mixture containing 82.8% tetrachloroethylene by weight and having a normal boiling point of 88.5° C.

A device for implementing the process according to my invention, therefore, comprises a vessel provided with an entrance port, an exhaust port at an upper level, and an outlet at a lower level. A conduit—or possibly several of them—extending through the entrance port connects a source of water to be purged, such as a discharge channel of a dry-cleaning establishment or other industrial plant carrying effluent of the type referred to, to one or more nozzles inside the vessel dispersing the incoming water in its interior. Low pressure as described above is set up and maintained inside the vessel by evacuation means such as a suction pump connected to the exhaust port and designed to extract the evolving vapors through that port; the remainder of the water, collecting in the lower region, is removed from the vessel by drain means connected to the outlet.

On leaving the discharge orifice of the nozzle, all or part of the entering water is finely divided into a multiplicity of small particles of large surface-to-volume ratio favoring vaporization. Care should be taken in all instances to avoid any direct flow from the nozzle orifice to the exhaust in order to let a substantial part of the droplets, from which the contaminants have evaporated, collect at the bottom of the vessel as clean liquid to be drained off. In the case of an upright vessel, for example, the exhaust port and the outlet may be respectively disposed at the top and at the bottom of that vessel, the exhaust port being in line with a vertical axis of the nozzle which points either down or up. In the latter case, however, I prefer to interpose some obstacles such as baffles between the nozzle orifice and the exhaust port to prevent any direct accessing of that port by the emitted spray and in general, to extend the time of residence of the vapor particles in the vessel. Other suitable obstacles include a particulate filler in the upper region of the vessel.

A certain dispersion will, however, also occur in a relatively narrow vessel such as a horizontal sleeve having the entrance port and the outlet disposed at substantially the same level on opposite sides so that the water, entering as a generally horizontal jet, does not accumulate at the bottom. The injection of that jet creates around it a low-pressure zone which intensifies the partial vacuum created by the exhaust pump so that some water and much of the accompanying contaminants—especially the lower-boiling ones—will evaporate and be extracted as before.

BRIEF DESCRIPTION OF THE DRAWING

The above and other features of my invention will now be described in detail with reference to the accompanying drawing in which.

SPECIFIC DESCRIPTION

Figure 1:
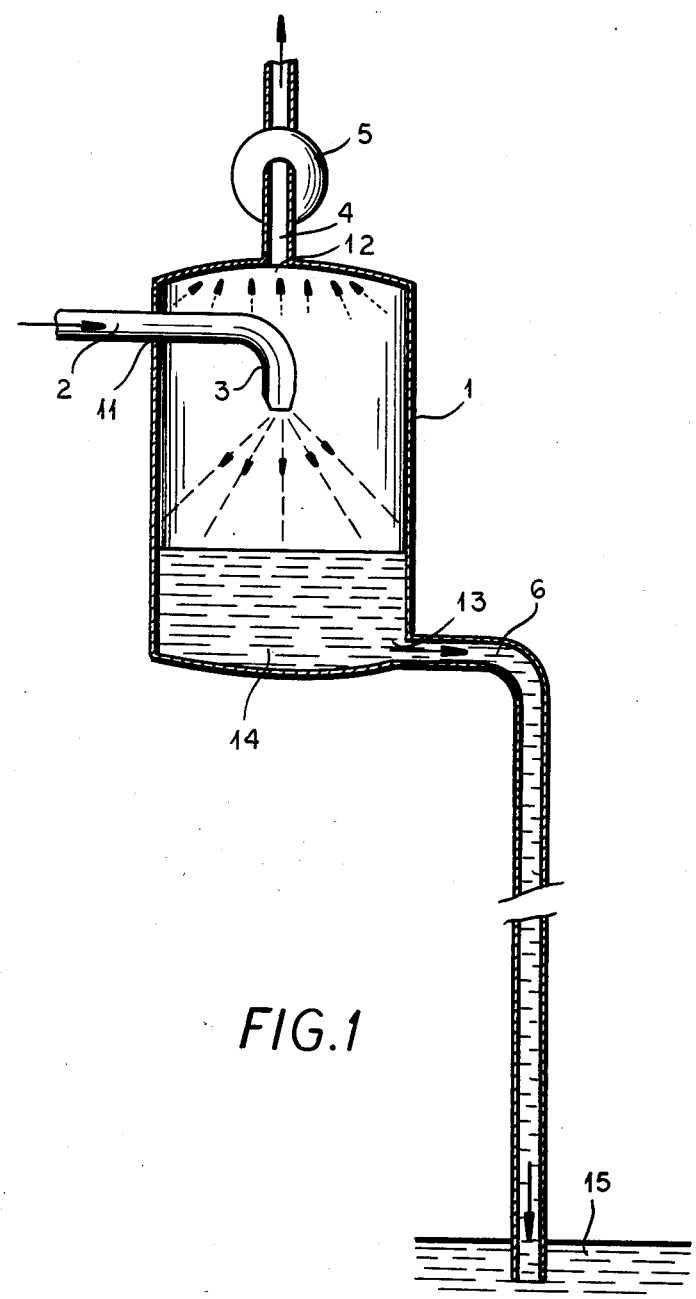
FIG. 1 is a sectional elevational view of a device for the decontamination of water laden with impurities of the type discussed above, representing a first embodiment.

In FIG. 1 an upright, preferably cylindrical vessell, centered on a vertical axis, has an entrance port 11, an exhaust port 12 and an outlet 13. A conduit 2 extending laterally through port 11, drawing water to be decontaminated from a nonillustrated source, terminates in an atomizing nozzle 3 directing a downward spray from a high level toward the bottom of the vessel where part of the water accumulates in a pool 14. Before doing, so, however, the water is thoroughly dispersed into fine droplets in the low-pressure atmosphere of the vessel which is being continuously evacuated by a suction pump 5 inserted in a discharge line 4 extending from port 12. The vessel is maintained at ambient temperature, not more than about 25° C., and the pressure is low enough to let some of the water and practically all the accompanying impurities (hydrocarbons and/or phenols, possibly chlorinated) vaporize and exit through port 12. The accumulated purified water is carried off through a drain pipe 6, extending from outlet 13, to a reservoir 15 assumed to lie at a lower level; if necessary, the drain may be provided with a discharge pump 9 as illustrated in FIG. 2.

Figure 2:
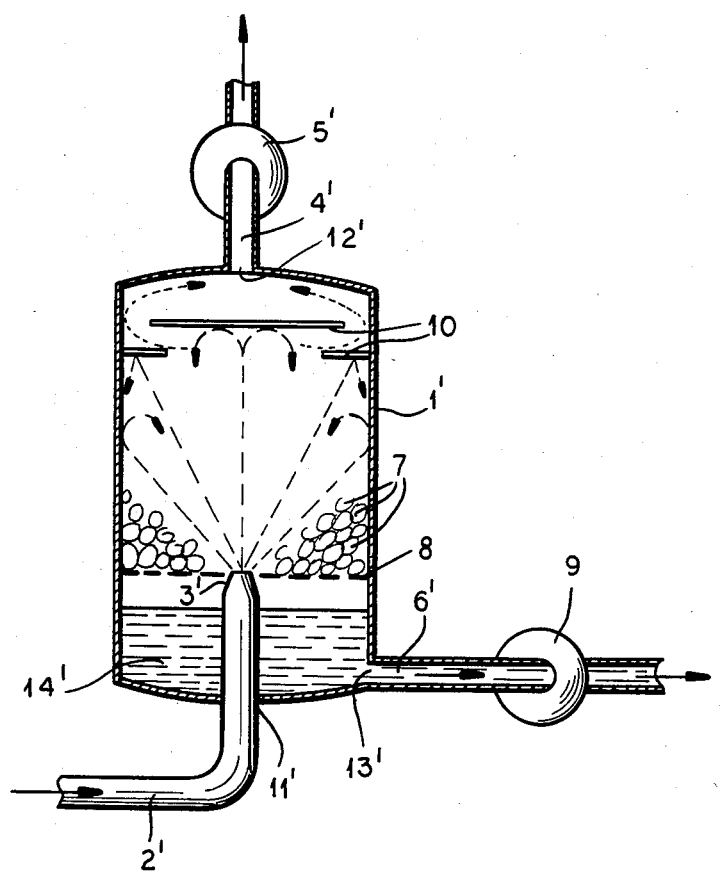
FIG. 2 is a view similar to FIG. 1, illustrating a modification.

In FIG. 2, where elements corresponding to those of FIG. 1 have been designated by the same reference numerals supplemented by a prime mark, the supply conduit 2′ enters the vessel 1′ from below which is structurally more convenient. Nozzle 3′ has again a vertical axis, in line with exhaust port 12′, but has its discharge orifice pointing upward. Baffles 10 interposed between the nozzle and the exhaust port 12′, however, prevent the evolving vapors from being directly drawn out; moreover, they extend the residence time of the droplets in the vessel for letting the contaminants vaporize freely while the evaporation of water is limited—as also in the device of FIG. 1—by saturation of the interior of the vessel with water vapor. In FIG. 2 I have also shown a horizontal grid 8 which separates the upper exhaust region from the lower drainage region and serves as a support for a particulate filler 7 in the form of pieces of, say, ceramic material, plastic or metal; this filler 7 likewise delays the escape of the volatilized components.

Figure 3:
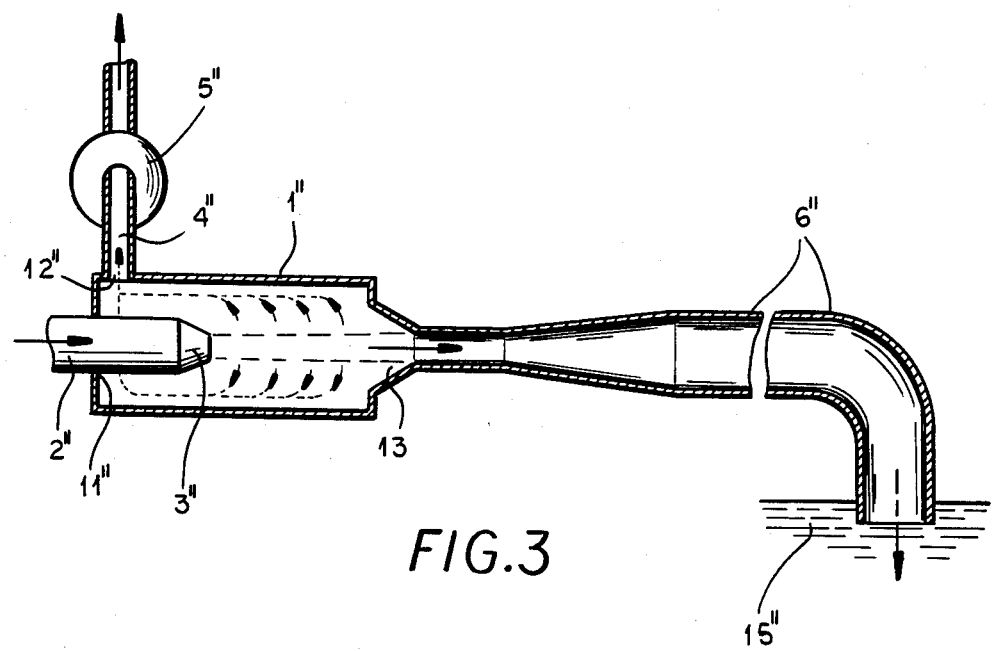
FIG. 3 is another sectional elevational view, showing a device representing a second embodiment.
Figures 4, 5:
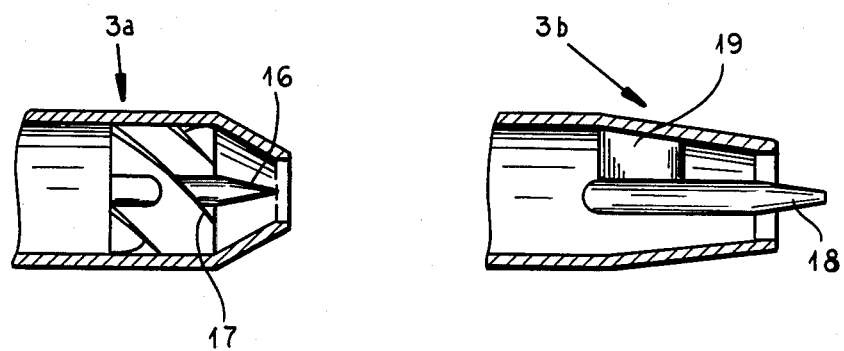
FIGS. 4 and 5 are sectional detail views of nozzle structures usable with the devices embodying my invention.

In FIG. 3, where elements having counterparts in preceding Figures have been designated by the same reference numerals followed by a double prime mark, vessel 1″ is a horizontal sleeve of about three times the diameter of supply conduit 2″ entering that vessel at its left-hand end, in line with a flared outlet 13″ from which drain pipe 6″ extends to a reservoir 15″. Pipe 6″, designed as a diffusor at its extremity connected to outlet 13″, is coaxial with nozzle 3″ whose discharge orifice, it should be noted, is offset to the right—i.e. toward the outlet—from exhaust port 12″ so that, again, pump 5″ does not directly act upon the incoming spray. Rather, the partial volume established by this pump is intensified by the Venturi effect so that the jet is surrounded by a low-pressure zone promoting vaporization of the lower-boiling components. Thus, the device of FIG. 3 is especially useful for contaminants whose vapor pressure at the operating temperature lies well above that of water.

The separation of the contaminants from the main water flow is further enhanced by centrifugation when the nozzle is provided with internal deflector means imparting a spin to the entering water flow. Thus, I have shown in FIG. 4 a nozzle **3*a* with a central stud 16, surrounded by a helical ramp 17, and in FIG. 5 a similar nozzle 3*b* with a central stud 18 provided with sloping blades 19 (only one illustrated). With the device of FIG. 3, even contaminant vapors entrained by the water flow into the reservoir 15″** will not redissolve but will bubble out of the water body into the atmosphere.

I claim:

1. A device for purging water from hydrocarbons, phenols and other contaminants having vapor pressures not substantially less than that of water at a given temperature, consisting of:

an upright vessel provided with a central exhaust port at a top wall of said vessel and a lateral outlet at a lower level adjacent a bottom wall of said vessel;

conduit means connected to a source of water to be purged, said conduit means extending upwardly through a bottom wall of said vessel and terminating centrally inside said vessel above said outlet in a nozzle emitting an upward generally conical spray of finely divided particles of said water in dispersed form;

evacuation means connected to said exhaust port for generating in said vessel a pressure low enough to let part of said water be vaporized together with accompanying contaminants at an ambient temperature and for extracting the resulting vapors from an upper region of said vessel above said outlet;

drain means connected to said outlet for removing the remainder of said water from a lower region of said vessel; and a horizontal center baffle plate in said vessel below said exhaust port and at least one further horizontal baffle plate extending inwardly from a vertical wall of said vessel below said central baffle plate and radially overlapping said central baffle plate to deflect droplets downwardly.

2. A device for purging water from hydrocarbons, phenols and other contaminants having vapor pressures not substantially less than that of water at a given temperature, consisting of:

an upright vessel provided with a central exhaust port at a top wall of said vessel and a lateral outlet at a lower level adjacent a bottom wall of said vessel;

conduit means connected to a source of water to be purged, said conduit means extending upwardly through a bottom wall of said vessel and terminating centrally inside said vessel above said outlet in a nozzle emitting an upward generally conical spray of finely divided particles of said water in dispersed form;

evacuation means connected to said exhaust port for generating in said vessel a pressure low enough to let part of said water be vaporized together with accompanying contaminants at an ambient temperature and for extracting the resulting vapors from an upper region of said vessel above said outlet;

drain means connected to said outlet for removing the remainder of said water from a lower region of said vessel; and a horizontal center baffle plate in said vessel below said exhaust port and at least one further horizontal baffle plate extending inwardly from a vertical wall of said vessel below said central baffle plate and radially overlapping said central baffle plate to deflect droplets downwardly;

a horizontal grid extending across said vessel substantially level with said nozzle; and a particulate filler resting on said grid.

* * * * *